(12) United States Patent
Aggrawal et al.

(10) Patent No.: US 11,520,482 B2
(45) Date of Patent: Dec. 6, 2022

(54) NAVIGATING DISPLAYED GRAPHICAL USER INTERFACE PANELS USING ASSIGNED KEYBOARD SHORTCUT KEY(S)

(71) Applicant: salesforce.com, inc., San Francisco, CA (US)

(72) Inventors: Sakhi Aggrawal, San Francisco, CA (US); Alain Orbino, Bellevue, WA (US); Cordelia McGee-Tubb, San Francisco, CA (US); Jesse Hausler, Boulder, CO (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/249,168

(22) Filed: Feb. 22, 2021

(65) Prior Publication Data

US 2022/0269406 A1  Aug. 25, 2022

(51) Int. Cl.
*G06F 3/0489* (2022.01)
*G06F 3/023* (2006.01)
*G06F 3/0482* (2013.01)
*G06F 3/0481* (2022.01)
*H04L 67/75* (2022.01)

(52) U.S. Cl.
CPC ........ *G06F 3/04897* (2013.01); *G06F 3/0238* (2013.01); *G06F 3/0481* (2013.01); *G06F 3/0482* (2013.01); *H04L 67/75* (2022.05)

(58) Field of Classification Search
CPC .. G06F 3/04897; G06F 3/0238; G06F 3/0481; G06F 3/0482; H04L 67/36
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |

(Continued)

*Primary Examiner* — Jennifer N Welch
*Assistant Examiner* — K C Chen
(74) *Attorney, Agent, or Firm* — LKGlobal | Lorenz & Kopf, LLP

(57) ABSTRACT

A system to control navigation of graphical user interface (GUI) panels on a web page includes a processor and a storage medium that stores instructions that are configurable to cause the processor to perform a method of navigating the GUI panels. The method controls display of a web page having GUI panels, and receives input associated with a command to change focus away from a first GUI panel. The input is generated in response to selection of an assigned keyboard key, selection of an assigned combination of keyboard keys, or selection of an assigned sequence of keyboard keys by a user. In response to receiving the input, a second GUI panel is identified, and focus is switched from the first GUI panel to the second GUI panel.

20 Claims, 4 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,751,538 B1 * | 6/2014 | Wheeler ............... H04M 15/55 707/791 |
| 8,977,966 B1 * | 3/2015 | Saurav .................. G06F 3/0489 715/854 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0137538 A1 * | 7/2003 | Hesmer ................. G06F 40/157 715/760 |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2012/0242692 A1 * | 9/2012 | Laubach ............. G06F 3/04883 345/629 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0059606 A1 * | 2/2014 | Selim ................... H04N 21/422 725/38 |
| 2014/0108981 A1 * | 4/2014 | Payzer .................. G06F 3/0481 715/767 |
| 2014/0245205 A1 * | 8/2014 | Smith ................. G06F 3/04892 715/767 |

* cited by examiner

US 11,520,482 B2

NAVIGATING DISPLAYED GRAPHICAL USER INTERFACE PANELS USING ASSIGNED KEYBOARD SHORTCUT KEY(S)

TECHNICAL FIELD

Embodiments of the subject matter described herein relate generally to database systems and cloud-based application server systems. More particularly, embodiments of the subject matter relate to the use of assigned keyboard shortcut keys for purposes of navigating graphical user interface (GUI) panels and focused GUI elements within GUI panels.

BACKGROUND

Improving expedient website, web page, and web-based application navigation for uses has become a concern for application administrators and developers. Intra-page links, active user interface (UI) elements, and selectable features are often provided on web pages to enable the user to quickly and easily navigate through different features, pages, GUI panels, focused UI elements, and the like. For example, a user can select an active link using a pointing device to navigate to a section of interest. A user may also use the arrow keys of a keyboard to scroll a displayed web page up or down. As another example, a user may use the Tab key of a keyboard to sequentially navigate through active links or UI elements displayed on a web page.

Certain users may rely on a physical hardware keyboard to interact with a web page, website, or web-based application. Most web browsers support traversing web pages via the Tab key, which allows keyboard navigators to move through and interact with different UI elements displayed on a web page. A problem arises when a page is full of many interactive UI elements, because it becomes tedious and time consuming for a keyboard navigator to Tab through multiple elements to reach a final destination. This problem is exacerbated if the web page includes multiple GUI panels containing UI elements, which may require many Tab key actuations to navigate from one GUI panel to another GUI panel.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The subject matter presented here relates to a methodology for navigating displayed graphical user interface (GUI) panels of a web page, which may be associated with a web site, a web-based application, a browser-based system interface, or the like. In this context, a GUI panel is a high level component of a web page that may include active elements or subcomponents, static or inactive elements or subcomponents, text labels, drop-down menus, text entry fields, hyperlinks, selectable buttons, toolbars, icons or profile pictures, scrollbars, and/or any number of other user interface (UI) elements. A web page may display any number of GUI panels in any desired layout or format. Moreover, a web page may support the display of modal GUI panels, pop-up GUI panels, dialog boxes, and/or other types of "temporary" display panels. As one example, a web page of a cloud-based application may include a static or permanent Main Navigation GUI panel, a static or permanent Sidebar GUI panel, and a number of additional GUI panels that can be activated for display and closed on demand by the user. In this regard, GUI panels that can be opened and closed by the user may include, without limitation: a Contacts panel; a Calendar panel; a Tasks panel; a Sales Pipeline panel; a Chat panel; etc. Any given GUI panel can include a plurality of focusable UI elements that, when selected, initiate a designated or defined function, operation, or command.

The methodology disclosed here provides a quick and easy way to navigate a plurality of GUI panels via user interaction with a keyboard. Although the disclosed methodology can be utilized with a virtual keyboard, a touchpad keyboard, or a displayed touchscreen keyboard, the methodology is suitable and appropriate for traditional hardware (physical) keyboard devices. In this regard, users who take advantage of physical keyboard shortcuts or hotkeys will quickly become familiar with the disclosed navigation methodology, which utilizes an assigned keyboard key, an assigned combination of keyboard keys, or an assigned sequence of keyboard keys.

Figure 1:
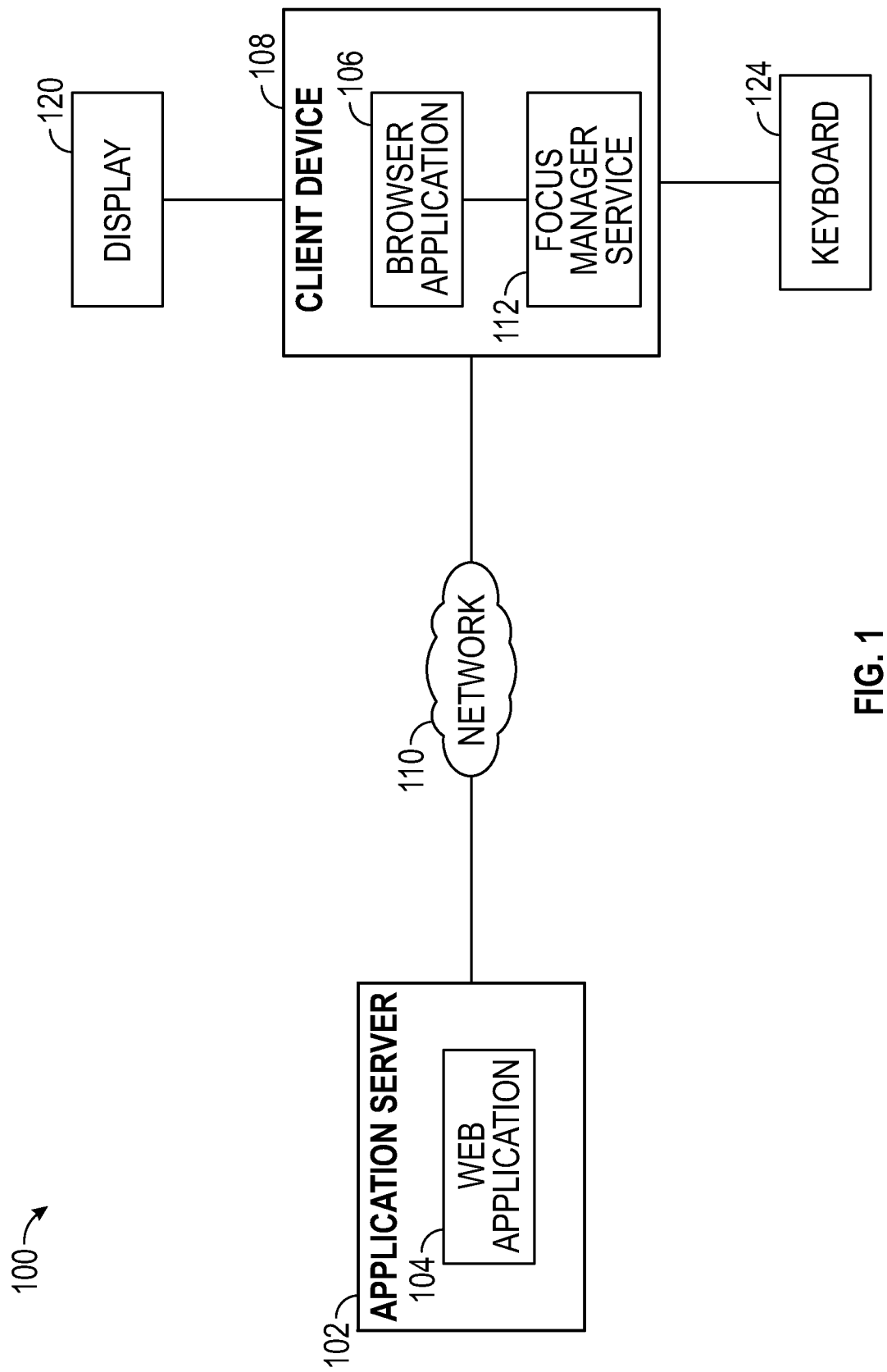
FIG. 1 is a simplified block diagram representation of an exemplary embodiment of a system to control navigation of GUI panels displayed on a web page.

FIG. 1 is a simplified block diagram representation of an exemplary embodiment of a system 100 to control navigation of GUI panels displayed on a web page. It should be appreciated that FIG. 1 depicts a simplified representation of the system 100 for purposes of explanation and is not intended to be limiting. The system 100 includes an application server 102 that is configurable to provide instances of a web application 104 within a client application (e.g., a web browser application 106) executed on a client device 108. The client device 108 is communicatively coupled to the application server 102 via a communication network 110, such as the Internet or any sort or combination of wired and/or wireless computer network, a cellular network, a mobile broadband network, a radio network, or the like. In one or more implementations, the web application 104 is realized as a virtual application generated at run-time or on-demand. As described in greater detail below, the web browser application 106 includes or utilizes a focus manager service 112 to facilitate the GUI panel navigation techniques and methodology described herein.

The client device 108 generally represents an electronic device coupled to the network 110 that may be utilized by a user to access the web application 104 on the application server 102. A user of the client device 108 can manipulate and control the functions and features of the web application 104 via the browser application 106. In practice, the client device 108 can be realized as any sort of personal computer, mobile telephone, tablet, wearable device, vehicle-based component, smart medical device or appliance, or other network-enabled electronic device. In exemplary embodiments, the client device 108 includes or communicates with a display device 120, such as a monitor, screen, or another conventional electronic display, which is capable of graphically presenting data and/or information provided by the web application 104. More specifically, the display device 120 can be used to present web pages of the web application 104, which may include GUI panels and UI elements as mentioned above. The client device 108 also includes or cooperates with at least one user input device, such as a physical hardware keyboard 124, a touchscreen, a touch panel, a mouse, a joystick, a directional pad, a motion sensor, or the like, which is capable of receiving input from the user of the client device 108. The keyboard 124 includes selectable keys in any desired layout, as is well understood. The keyboard 124 may include Function keys (usually numbered from F1 to F12), system keys, arrow keys, a Tab key, and other common and conventional keyboard keys.

The client device 108 executes or otherwise supports the web browser application 106 (or any suitable client application) that communicates with the web application 104 on the application server 102 using a networking protocol. The client device 108 generally represents a computing device or platform having a combination of processing logic, circuitry, hardware, and/or other components configured to support the web browser application 106 and related GUI navigation processes, tasks, operations, and/or functions described herein. In this regard, the client device 108 generally includes a processing system, which may be implemented using, for example, one or more processors, central processing units (CPUs), controllers, microprocessors, microcontrollers, processing cores and/or other hardware computing resources configured to support the operation of the system described herein. The processing system may include or otherwise access a data storage element (or memory) capable of storing programming instructions for execution by the processing system. The instructions are configurable such that, when read and executed, they cause the processing system to provide instances of the web browser application 106.

The web browser application 106 is configured and operated to contact the application server 102 and/or the web application 104 using a networking protocol, such as the hypertext transport protocol (HTTP) or the like, to access or otherwise initiate an instance of the web application 104 being presented on the client device 108 (e.g., by or within the web browser application 106). In certain implementations, the focus manager service 112 is incorporated in the web browser application 106, such that the client device 108 can support the web application 104 and related GUI navigation processes, tasks, operations, and/or functions described herein.

The application server 102 generally represents a server computing device, server computing system or another combination of processing logic, circuitry, hardware, and/or other components configured to support the web application 104 and related GUI navigation processes, tasks, operations, and/or functions described herein. In this regard, the application server 102 generally includes a processing system, which may be implemented using, for example, one or more processors, central processing units (CPUs), controllers, microprocessors, microcontrollers, processing cores and/or other hardware computing resources configured to support the operation of the system described herein. The processing system may include or otherwise access a data storage element (or memory) capable of storing programming instructions for execution by the processing system. The instructions are configurable such that, when read and executed, they cause the processing system to create, generate, or otherwise facilitate an application platform that generates or otherwise provides instances of the web application 104 at run-time (or "on-demand") based at least in part upon code and other data that is stored or otherwise maintained by the memory, a database, or another location on the network 110. Depending on the embodiment, the memory may be realized as a random access memory (RAM), read only memory (ROM), flash memory, magnetic or optical mass storage, or any other suitable non-transitory short or long term data storage or other computer-readable media, and/or any suitable combination thereof.

Figure 2:
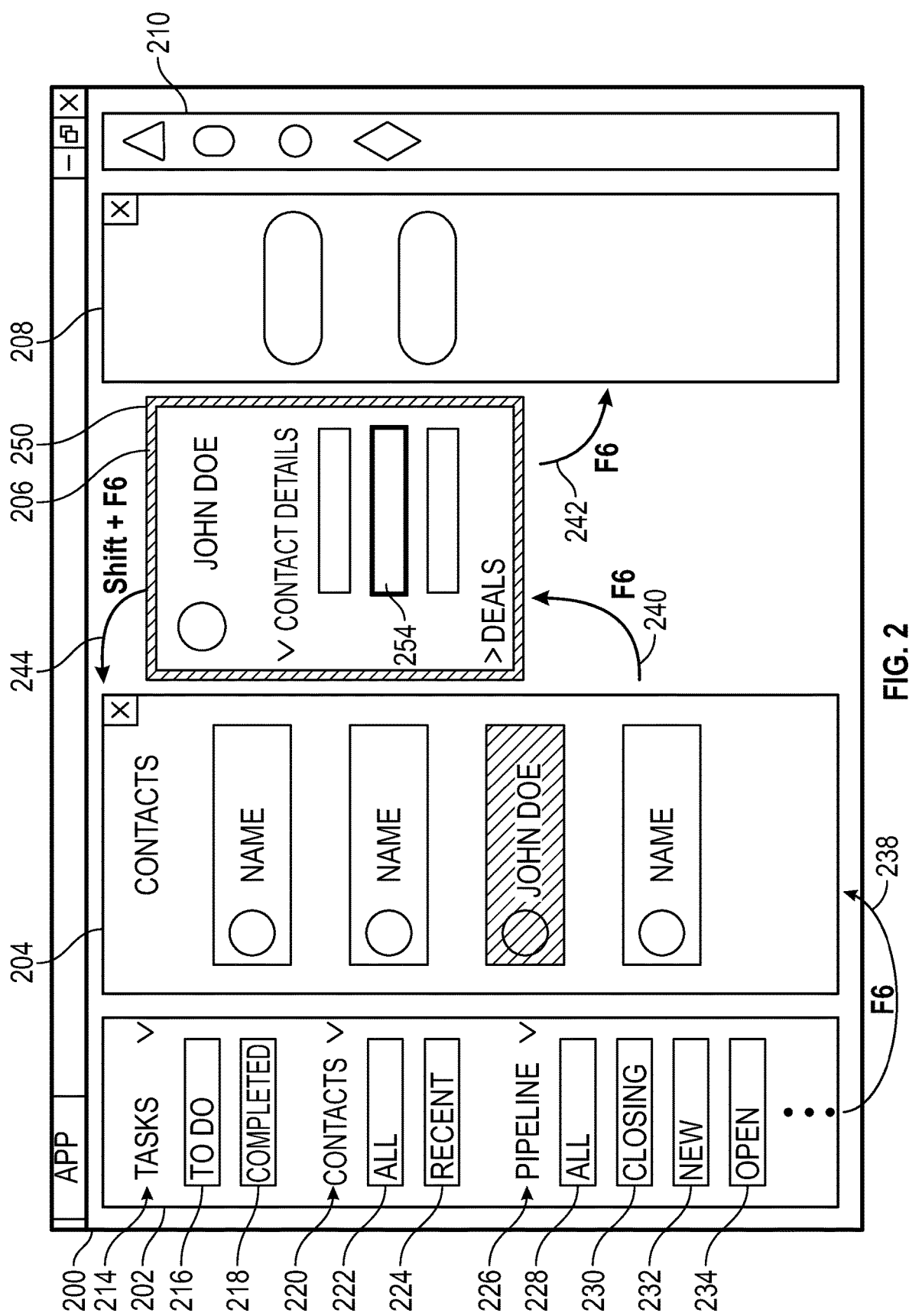
FIG. 2 is a schematic representation of a web page that includes a plurality of displayed GUI panels.

FIG. 2 is a schematic representation of a web page 200 that includes a plurality of displayed GUI panels. Referring again to FIG. 1, a user of the client device 108 may utilize the web browser application 106 to display the web page 200 on the display device 120. The web browser application 106 accesses a Uniform Resource Locator (URL) or other network location associated with the application server 102 or the web application 104, which in turn generates the web page 200 and possibly other web pages as desired. It should be noted that the illustrated embodiment of the web page 200 is merely one example of a web page that can be navigated using the methodology presented here. The specific layout, format, number of GUI panels, and number of UI elements of any particular web page can vary according to the intended usage, design concepts, functionality, and displayed content.

FIG. 2 depicts the web page 200 at one particular moment in time, with a current state of focus. Navigation of the GUI panels and UI elements, user interaction with interactive components, opening and closing of GUI panels, and other actions involving the web page 200 may update the displayed content or format of the web page 200 and/or change the state of focus. Accordingly, as the user manipulates and interacts with the web page 200, the displayed content, number of GUI components, and layout of elements can change.

The depicted state of the web page 200 includes five displayed GUI panels, which occupy most of the displayed area of the web page 200. More specifically, the web page 200 includes the following displayed GUI panels: a main navigation panel 202; a contacts panel 204; an individual contact panel 206; a supplemental (miscellaneous) panel 208; and a sidebar panel 210. For this example, the main navigation panel 202 and the sidebar panel 210 are fixed or permanent in that they are persistently displayed on the web page 200. In contrast, the contacts panel 204, the individual contact panel 206, and the supplemental panel 208 are non-persistent in that they can be removed, closed, deactivated, deleted, or hidden from view, either automatically or by the user. Some or all of the displayed GUI panels are focusable (selectable) by the user. Focusing on a panel "activates" that panel for further manipulation, interaction, or navigation within the panel. This description assumes that all five of the panels shown in FIG. 2 are focusable.

The user can quickly and easily change focus of the GUI panels in a sequential manner via an assigned keyboard key, an assigned combination of keyboard keys, or an assigned sequence of keyboard keys. The non-limiting implementation described here assigns the F6 keyboard key as a GUI panel focus switching key. Repeatedly pressing the F6 key advances focus of the GUI panels in sequential order, wherein focus changes in accordance with a specific focus switching order that is managed by the system 100. Conversely, selection/actuation of the Shift+F6 key combination changes focus of the GUI panels in the reverse order. The F6 key (and Shift+F6 key combination) are used for the exemplary embodiment described here. Alternatively, the system 100 can be configured to support any assignable key, combination of keys, or key sequence, as long as the assigned key(s) do not conflict with other system level or application level shortcuts, hotkeys, function keys, command keys, or the like. In certain embodiments, the key(s) utilized for quick GUI panel navigation can be user-defined, user-assigned, or user-configured.

The GUI panel switching order for this example is as follows: the main navigation panel 202>the contacts panel 204>the individual contact panel 206>the supplemental panel 208>the sidebar panel 210. Assume that the main navigation panel 202 is the currently focused GUI panel. A single actuation of the F6 key changes focus from the main navigation panel 202 to the contacts panel 204 (as indicated by the F6 arrow labeled with reference number 238). Another actuation of the F6 key switches focus from the contacts panel 204 to the individual contact panel 206 (as indicated by the F6 arrow labeled with reference number 240). Yet another actuation of the F6 key switches focus from the individual contact panel 206 to the supplemental panel 208 (as indicated by the F6 arrow labeled with reference number 242). Conversely, actuation of the Shift+F6 key combination changes focus in the reverse direction from the individual contact panel 206 to the contacts panel 204 (as indicated by the Shift+F6 arrow labeled with reference number 244). In this way, the user can quickly and easily navigate through the displayed GUI panels using the F6 key (to navigate forward) or the Shift+F6 key combination (to navigate backward).

A GUI panel may include any number of focusable UI elements. The example presented here assumes that each GUI panel includes a plurality of different focusable UI elements. In this regard, the main navigation panel 202 includes at least the following focusable UI elements: the Tasks element 214; the To Do element 216 (which is associated with Tasks); the Completed element 218 (which is associated with Tasks); the Contacts element 220; the All element 222 (which is associated with Contacts); the Recent element 224 (which is associated with Contacts); the Pipeline element 226; the All element 228 (which is associated with Pipeline); the Closing element 230 (which is associated with Pipeline); the New element 232 (which is associated with Pipeline); and the Open element 234 (which is associated with Pipeline). The contacts panel 204 includes four focusable UI elements corresponding to four contact entries. The individual contact panel 206 includes at least the following focusable UI elements: the Contact Details element; three detail fields (which are associated with the Contact Details); and the Deals element. The Deals element can be selected to display additional information related to deals being handled by the displayed contact (e.g., John Doe). The supplemental panel 208 includes two focusable UI elements, and the sidebar panel 210 includes four focusable UI elements. The number, layout, and functionality of UI elements within a given GUI panel may vary from one application to another, and FIG. 2 merely represents one suitable example.

Selection or actuation of the Tab key of the user's keyboard changes focus of the displayed UI elements of the web page 200. More specifically, the user can sequentially advance focus through a plurality of focusable UI elements via selection of the keyboard Tab key. Repeated selection/actuation of the Tab key causes focus to change in accordance with a designated focus switching order of the UI elements within any given GUI panel. Conversely, selection/actuation of the Shift+Tab keys changes focus in the reverse switching order. For example, assume that the main navigation panel 202 is the currently focused GUI panel, and the Closing element 230 is the currently focused UI element within the main navigation panel 202. Actuation of the Tab key changes focus from the Closing element 230 to the New element 232, while actuation of the Shift+Tab key combination changes focus from the Closing element 230 to the All element 228. In this way, the user can quickly and easily navigate the individual UI elements using the Tab key (to navigate forward) or the Shift+Tab key combination (to navigate backward).

As mentioned above, FIG. 2 depicts the currently focused state of the web page 200 at one particular moment in time. The individual contact panel 206 is currently in focus. In certain embodiments, the currently focused GUI panel is displayed to be visually distinguishable, highlighted, or marked, relative to the non-focused GUI panels. The currently focused GUI panel can be displayed with any visually distinguishable characteristic to make it more noticeable on the web page 200. In this regard, FIG. 2 depicts the individual contact panel 206 displayed with a visually distinguishable colored, highlighted, accented, or animated frame 250 surrounding the contact panel 206. Depending on the implementation, current focus can be indicated with one or more of the following characteristics, without limitation: color; transparency level; highlighting; glowing effect; shine effect; fill pattern; different font styles; graphical accents; themes; animation. The visually distinguishable characteristic can be displayed in response to switching focus from one GUI panel to another, to make it easy for the user to detect which panel is currently in focus.

FIG. 2 also depicts a currently focused detail field 254 within the individual contact panel 206. Current focus of the detail field 254 can be indicated using one or more visually distinguishable characteristics (as described above with reference to the GUI panels). The system 100 saves the focus state of a currently focused GUI panel to preserve the currently focused UI element. Saving the identity of the currently focused UI element is desirable to enable the system 100 to return to the previous focus state if focus switches away from the currently focused GUI panel, but eventually returns. If focus returns to a previously focused GUI panel, the system 100 can retrieve or access the saved focus state to determine the previously focused UI element within that panel. For the illustrated example, therefore, if the user switches focus away from the individual contact panel 206, but thereafter returns to the individual contact panel 206, the system 100 controls the display of the web page 200 such that the detail field 254 remains in focus (rather than defaulting to another UI element within the individual contact panel 206).

Figure 3:
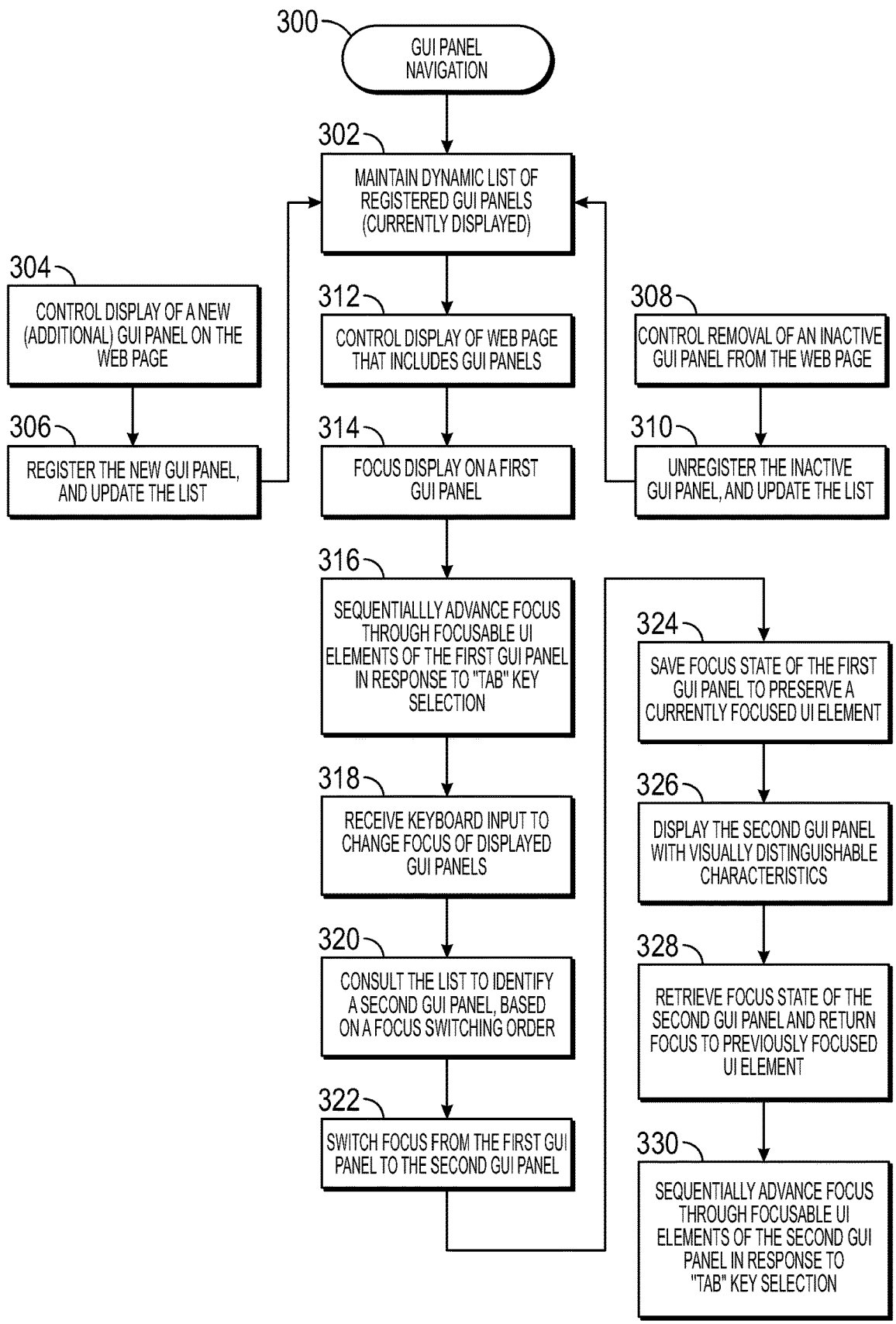
FIG. 3 is a flow chart that illustrates an exemplary embodiment of a method of controlling navigation of GUI panels displayed on a web page.

FIG. 3 is a flow chart that illustrates an exemplary embodiment of a GUI panel navigation process 300. The process 300 represent a suitable methodology for controlling navigation of GUI panels displayed on a web page. The various tasks performed in connection with the process 300 may be performed by software, hardware, firmware, a service, or any combination thereof. For illustrative purposes, the following description of the process 300 may refer to elements mentioned above in connection with FIG. 1 and FIG. 2. In practice, the process 300 may be performed by at least one component or element of the described system, e.g., the application server 102, the web application 104, the focus manager service 112, the client device 108, or the web browser application 106. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

The GUI panel navigation process 300 maintains a dynamic list of registered GUI panels that are to be currently displayed (or are already currently displayed) on the web page of interest (task 302). For the exemplary implementation described here, the list of registered GUI panels can be maintained and updated by an appropriate service, such as the focus manager service 112 described above with reference to FIG. 1. In this regard, each entry in the list may include the following information, without limitation: the name of the GUI panel; a number or any suitably formatted identifier of the focus switching order (e.g., lower numbers are focused before higher numbers); a Focus On Panel callback function that is executed when the process 300 controls focus on a GUI panel; a Focus Away From Panel callback function that is executed when the process 300 controls focus away from a GUI panel. The Focus On Panel function is called by the focus manager service, and the GUI panel of interest (i.e., the panel that gains focus) implements the function to return to its previous focus state, change its appearance, or the like. The Focus Away From Panel function is called by the focus manager service, and the GUI panel of interest (i.e., the panel that loses focus) implements the function to, for example, perform Cascading Style Sheets (CSS) cleanup, to change its appearance, save its focus state, or the like.

The registration information for a permanent, fixed, or static GUI panel may be hard-coded or preconfigured with the focus manager service. A temporary, modal, or pop-up GUI panel may pass its registration information to the focus manager service when activated for display on the web page, e.g., when inserted into the Document Object Model (DOM) tree of the web page. When a GUI panel is closed, deleted, or otherwise removed from the web page, it may unregister itself for removal from the list of registered GUI panels.

The list of registered GUI panels is dynamic in nature to accommodate the display of new or additional GUI panels and to contemplate the removal of inactive or closed GUI panels. To this end, the process 300 can control the display of a new GUI panel on the web page (task 304) if needed, and can register the new GUI panel such that the list of registered GUI panels includes the new GUI panel (task 306). Conversely, the process 300 can control the removal of an inactive GUI panel from the displayed web page (task 308), and can unregister the inactive GUI panel such that the list of registered GUI panels no longer includes the inactive GUI panel (task 310).

The process 300 controls the display of the web page of interest (task 312), wherein the web page includes a plurality of visibly distinct GUI panels. This description assumes that the web page is displayed with focus on a first GUI panel (task 314), e.g., a currently active panel. Moreover, the web page can be displayed with initial focus on one particular UI element of the first GUI panel. As mentioned previously, an assigned keyboard key, hotkey, user-configured key, key combination, or key sequence can be utilized to change focus of UI elements within the currently focused GUI panel. Accordingly, the process 300 can sequentially advance focus through the plurality of focusable UI elements (of the currently displayed first GUI panel) in response to selection, actuation, or activation of a keyboard Tab key by the user of the client device (task 316). In certain embodiments, the process 300 keeps track of which UI element is currently in focus. The current focus state can be maintained by the GUI panel itself, by the focus manager service, or by any suitable component or service utilized by the system.

This example assumes that the user of the client device selects, actuates, or activates an assigned keyboard key (e.g., the F6 key), an assigned combination of keyboard keys (e.g., the Shift+F6 combination), or an assigned sequence of keyboard keys, to move focus away from the first GUI panel to a second GUI panel (which is different than the first GUI panel). Accordingly, the process 300 receives appropriate keyboard input that is associated with a command to change focus away from the first GUI panel (task 318), wherein the keyboard input is generated in response to selection, actuation, or activation of at least one assigned keyboard key or hotkey as explained above. Repeated actuation of the assigned keyboard key(s) or designated hotkey(s) advances focus through the plurality of displayed GUI panels in accordance with a sequence defined by the focus switching order of the GUI panels.

As mentioned above, each of the registered GUI panels has a respective focus switching order associated therewith. In certain embodiments, each focusable GUI panel supported by the system has a unique switching order identifier (e.g., a number) assigned thereto. The switching order numbers can be hard-coded such that they remain fixed (unless changed by updating the relevant code). Alternatively, at least some focusable GUI panels may have dynamically assigned switching order identifiers. For example, a temporary GUI panel can assign itself (or be assigned) a switching order number when it becomes available for display. An assigned switching order number can be randomly assigned (subject to minimum and maximum limits), restricted to a particular range of values, or the like. Moreover, the system may be suitably configured to prevent or reduce the likelihood of switching order number conflicts between focusable GUI panels.

The switching order of the GUI panels enables the focus manager service to determine which GUI panel to focus on when receiving a request to move focus forward or backward. To this end, the process 300 may consult the list of registered GUI panels to identify the second GUI panel, based on the focus switching order (task 320). For example, task 320 may access the list of registered GUI panels and identify/select the panel having the next-highest switching order number (for advancing focus forward) or the panel having the next-lowest switching order number (for moving focus backward). In this way, the process 300 uses the focus switching order of the registered GUI panels to identify which GUI panel should receive focus next. Once the second GUI panel is identified, the process 300 continues by switching focus from the first GUI panel to the second GUI panel (task 322). The process 300 also saves the focus state of the first GUI panel to preserve the currently focused UI element of the first GUI panel (task 324). In certain embodiments, task 324 is carried out by the first GUI panel, which keeps track of its own focus state. Alternatively or additionally, task 324 may be carried out by the focus manager service 112, by a component of the web browser application 106, by other logic or another module of the client device 108, or the like.

The process 300 continues by causing the display of at least one visually distinguishable characteristic of the second GUI panel, in response to switching focus from the first GUI panel to the second GUI panel (task 326). As described above with reference to FIG. 2, the newly focused GUI panel may be displayed with a distinguishable color, highlighting, accent, or the like, e.g., a colored or highlighted frame surrounding the second GUI panel. After switching focus to the second GUI panel, the process 300 retrieves the previous focus state of the second GUI panel (if applicable) and returns focus to the previously focused UI element of the second GUI panel (task 328). In this manner, the process 300 can save the focus state of each GUI panel, such that any given GUI panel can regain focus with its previously focused UI element preserved.

As mentioned previously, an assigned keyboard key, hotkey, user-configured key, key combination, or key sequence (such as the Tab key and the Shift+Tab key combination) can be utilized to change focus of UI elements within the second (currently focused) GUI panel. Accordingly, the process 300 can sequentially advance focus through the plurality of focusable UI elements of the second GUI panel in response to selection, actuation, or activation of the Tab key, and can sequentially move focus backward through the UI elements of the second GUI panel in response to selection, actuation, or activation of the Shift+Tab key combination (task 330). Although not shown in FIG. 3, the process 300 can continue in an ongoing manner by updating the list of registered GUI panels, preserving the focus states of the GUI panels, and changing focus of the panels and UI elements within the panels, following the methodology outlined above.

As mentioned above, the switching order of the focusable GUI panels can be hard-coded or otherwise managed to avoid conflicts. Nonetheless, if two GUI panels share the same switching order number, then the focus manager service can implement a rule that gives "priority" according to registration time of the GUI panels. In this regard, the first-registered GUI panel is considered to have a lower switching order number, relative to the second-registered GUI panel (even though both GUI panels initially have the same switching order number). This can be accomplished by temporarily changing the switching order numbers or by flagging one or both of the GUI panels with their priority ordering relative to each other.

As mentioned above, GUI panels unregister themselves as needed such that they are removed from the registered list when they are closed or no longer displayed. In an implementation that does not maintain a dynamic registration list, however, GUI panel focus can be managed in an alternative manner to accommodate panels that are no longer active. For example, if the previously focused GUI panel is no longer displayed or available and the user selects the Shift+F6 key combination, then the focus manager service changes focus to the most recently focused GUI panel that is still active. If the previously focused GUI panel was the lowest numbered panel (relative to the focus switching order), then the focus manager service changes focus to the highest numbered panel that is still active (i.e., the focus order "loops back" as needed). Similarly, if a previously focused GUI panel having a higher switching order number than the currently focused GUI panel is no longer available and the user selects the F6 key, then the focus manager service changes focus to the next available GUI panel with a higher switching order number than the currently focused panel.

As mentioned above, the currently focused UI element of a focused GUI panel is preserved such that the UI element remains in focus if the user returns to that GUI panel after navigating away from it. If, however, the previously focused UI element is no longer active or displayed when focus returns to that GUI panel, then the focus manager service observes a rule that determines which UI element to select for focus. For example, if the previously focused UI element is no longer available in the focused GUI panel, then the focus manager service can instead focus on the first UI element of the panel, the last UI element of the panel, a default UI element of the panel, or the like.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4:
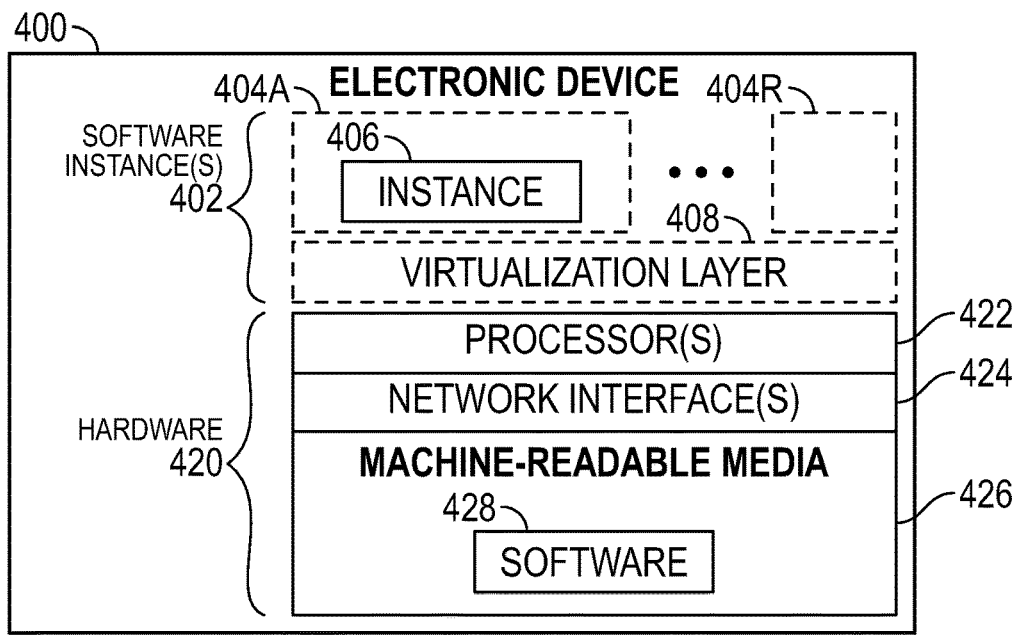
FIG. 4 is a simplified block diagram representation of an exemplary embodiment of an electronic device.

FIG. 4 is a simplified block diagram representation of an exemplary embodiment of an electronic device 400 according to some implementations. FIG. 4 includes hardware 420 including a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. The application server 102, the client device 108, and the focus manager service 112 may be implemented in one or more electronic devices 400. In certain implementations: 1) each of the clients is implemented in a separate one of the electronic devices 400 (e.g., in end user devices where the software 428 represents the software to implement clients to interface directly and/or indirectly with the authorization service (e.g., software 428 represents a web browser, a native client, a portal, a command-line interface, and/or an application programming interface (API) based upon protocols such as Simple Object Access Protocol (SOAP), Representational State Transfer (REST), etc.)); 2) the focus manager service 112 is implemented in a separate set of one or more of the electronic devices 400 (e.g., a set of one or more server devices where the software 428 represents the software to implement the focus manager service 112); and 3) in operation, the electronic devices implementing the clients and the focus manager service 112 would be communicatively coupled (e.g., by a network). Other configurations of electronic devices may be used in other implementations (e.g., an implementation in which the client and the authorization service are implemented on a single one of electronic device 400).

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Figure 5:
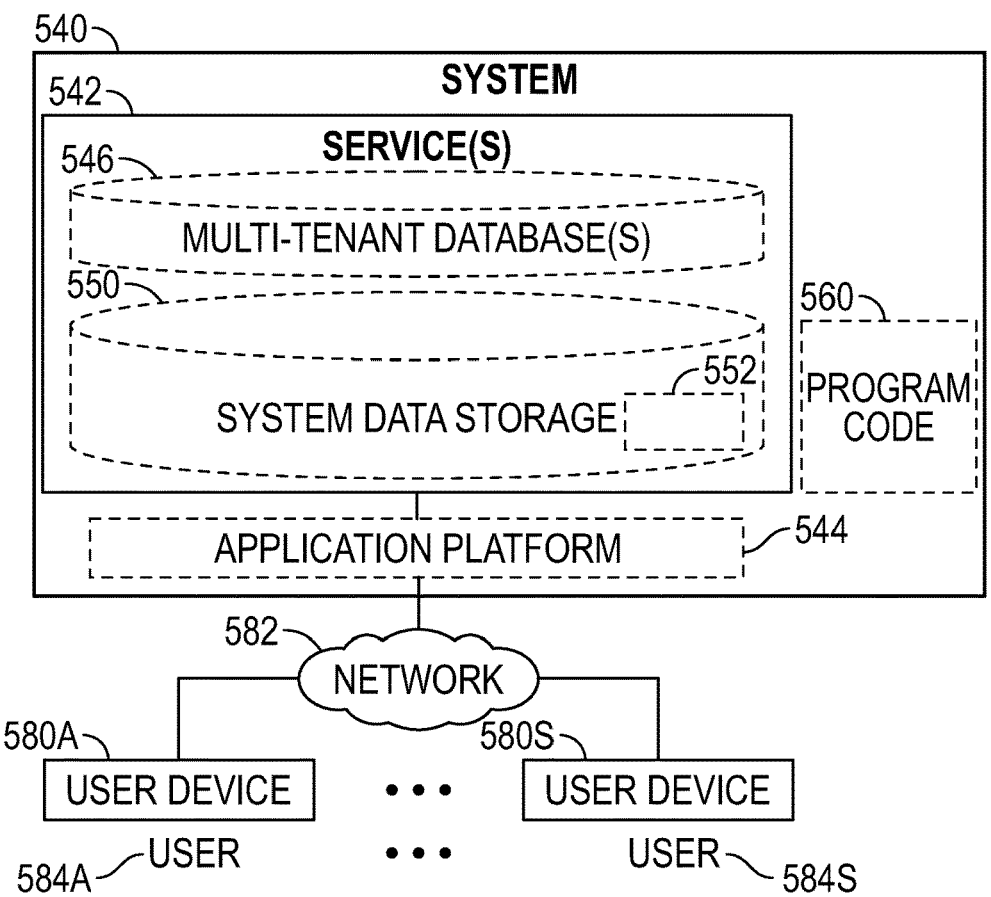
FIG. 5 is a simplified block diagram representation of an exemplary embodiment of a deployment environment.

FIG. 5 is a simplified block diagram representation of an exemplary embodiment of a deployment environment according to some implementations. A system 540 includes hardware (e.g., a set of one or more server devices) and software to provide service(s) 542, including the focus manager service 112. In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third-party datacenter(s), which are datacenter(s) owned and/or operated by one or more different entities than the entity that provides the service(s) 542 (e.g., the different entities may host some or all of the software provided and/or operated by the entity that provides the service(s) 542). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-580S over a network 582. The service(s) 542 may be on-demand services that are made available to one or more of the users 584A-584S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-584S). The service(s) 542 may communicate with each other and/or with one or more of the user devices 580A-580S via one or more APIs (e.g., a REST API). In some implementations, the user devices 580A-580S are operated by users 584A-584S, and each may be operated as a client device and/or a server device. In some implementations, one or more of the user devices 580A-580S are separate ones of the electronic device 400 or include one or more features of the electronic device 400.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user devices 580A-580S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 542 are implemented using virtual applications dynamically created at run time responsive to queries from the user devices 580A-580S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the authorization service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 6th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user devices 580A-580S.

Each user device 580A-580S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-584S to interact with various GUI pages that may be presented to the one or more of users 584A-584S. User devices 580A-580S might communicate with system 540 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 580A-580S might include an HTTP client, commonly referred to as a "browser," for sending and receiving HTTP messages to and from server(s) of system 540, thus allowing users 584A-584S of the user devices 580A-580S to access, process and view information, pages and applications available to it from system 540 over network 582.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

It should be understood that various aspects disclosed herein may be combined in different arrangements than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of controlling navigation of graphical user interface (GUI) panels displayed on a web page, the method comprising:
   controlling, by at least one processor, display of the web page comprising a plurality of GUI panels, wherein a first GUI panel of the plurality of GUI panels is focused for navigation of a first plurality of focusable user interface (UI) elements contained within the first GUI panel by actuation of a keyboard key;
   receiving, by a focus manager service, a panel focus switching input associated with a command to change focus away from the first GUI panel of the plurality of GUI panels, the panel focus switching input generated in response to selection of an assigned keyboard key, selection of an assigned combination of keyboard keys, or selection of an assigned sequence of keyboard keys by a user of a client device, wherein the panel focus switching input is different from the keyboard key;
   in response to receiving the panel focus switching input:
      identifying, by the focus manager service, a second GUI panel of the plurality of GUI panels to switch focus to in accordance with a sequence defined by a focus switching order by referencing respective switching order identifiers of the plurality of GUI panels, the second GUI panel being different than the first GUI panel and the second GUI panel comprising a second plurality of focusable UI elements contained within the second GUI panel for navigation by actuation of the keyboard key; and
      switching focus from the first GUI panel to the second GUI panel for navigation of the second plurality of focusable UI elements within the second GUI panel by actuation of the keyboard key, responsive to identifying the second GUI panel;
   saving a focus state of the first GUI panel to preserve a focused UI element of the first plurality of focusable UI elements; and
   after switching focus to the second GUI panel, returning focus to the first GUI panel with the focused UI element preserved.

2. The method of claim 1, further comprising:
   maintaining, by the focus manager service, a list of registered GUI panels currently displayed on the web page, each of the registered GUI panels having a respective focus switching order associated therewith;
   wherein the identifying step uses the focus switching order of the registered GUI panels to identify the second GUI panel.

3. The method of claim 2, further comprising:
   controlling, by the at least one processor, display of a new GUI panel on the web page; and
   registering, by the focus manager service, the new GUI panel such that the list of registered GUI panels includes the new GUI panel.

4. The method of claim 2, further comprising:
   controlling, by the at least one processor, removal of an inactive GUI panel from the web page; and
   unregistering, by the focus manager service, the inactive GUI panel such that the list of registered GUI panels no longer includes the inactive GUI panel.

5. The method of claim 1, further comprising:
causing display of a visually distinguishable characteristic of the second GUI panel, in response to switching focus from the first GUI panel to the second GUI panel.

6. The method of claim 1, wherein:
the panel focus switching input is generated in response to actuation of a designated hotkey; and
repeated actuation of the designated hotkey advances focus through the plurality of GUI panels in a sequential order.

7. The method of claim 1, wherein the keyboard key comprises a Tab key.

8. The method of claim 7, wherein the panel focus switching input comprises an F6 keyboard key.

9. The method of claim 1, wherein the panel focus switching input comprises at least one of an F6 keyboard key and a combination of Shift and the F6 keyboard key.

10. A non-transitory machine-readable storage medium that stores instructions executable by at least one processor, the instructions configurable to cause the at least one processor to perform operations comprising:
controlling display of a web page comprising a plurality of GUI panels, wherein a first GUI panel of the plurality of GUI panels is focused for navigation of a first plurality of focusable user interface (UI) elements contained within the first GUI panel by actuation of a keyboard key;
receiving a panel focus switching input associated with a command to change focus away from the first GUI panel of the plurality of GUI panels, the panel focus switching input generated in response to selection of an assigned keyboard key, selection of an assigned combination of keyboard keys, or selection of an assigned sequence of keyboard keys by a user of a client device, wherein the panel focus switching input is different from the keyboard key;
in response to receiving the panel focus switching input:
identifying a second GUI panel of the plurality of GUI panels to switch focus to in accordance with a sequence defined by a focus switching order by referencing respective switching order identifiers of the plurality of GUI panels, the second GUI panel being different than the first GUI panel and the second GUI panel comprising a second plurality of focusable UI elements contained within the second GUI panel for navigation by actuation of the keyboard key; and
switching focus from the first GUI panel to the second GUI panel for navigation of the second plurality of focusable UI elements within the second GUI panel by actuation of the keyboard key, responsive to identifying the second GUI panel;
saving a focus state of the first GUI panel to preserve a focused UI element of the first plurality of focusable UI elements; and
after switching focus to the second GUI panel, returning focus to the first GUI panel with the focused UI element preserved.

11. The non-transitory machine readable storage medium of claim 10, the instructions configurable to cause the at least one processor to perform operations comprising:
maintaining a list of registered GUI panels currently displayed on the web page, each of the registered GUI panels having a respective focus switching order associated therewith;
wherein the identifying step uses the focus switching order of the registered GUI panels to identify the second GUI panel.

12. The non-transitory machine readable storage medium of claim 11, the instructions configurable to cause the at least one processor to perform operations comprising:
controlling display of a new GUI panel on the web page; and
registering the new GUI panel such that the list of registered GUI panels includes the new GUI panel.

13. The non-transitory machine readable storage medium of claim 11, the instructions configurable to cause the at least one processor to perform operations comprising:
controlling removal of an inactive GUI panel from the web page; and
unregistering the inactive GUI panel such that the list of registered GUI panels no longer includes the inactive GUI panel.

14. The non-transitory machine readable storage medium of claim 10, the instructions configurable to cause the at least one processor to perform operations comprising:
causing display of a visually distinguishable characteristic of the second GUI panel, in response to switching focus from the first GUI panel to the second GUI panel.

15. The non-transitory machine readable storage medium of claim 10, wherein:
the instructions are configurable to cause the at least one processor to sequentially advance focus through the second plurality of focusable UI elements in response to selection of a keyboard Tab key by the user of the client device after switching focus to the second GUI panel.

16. The non-transitory machine readable storage medium of claim 10, wherein the keyboard key comprises a Tab key.

17. The non-transitory machine readable storage medium of claim 10, wherein the panel focus switching input comprises at least one of an F6 keyboard key and a combination of Shift and the F6 keyboard key.

18. A system to control navigation of graphical user interface (GUI) panels displayed on a web page, the system comprising:
at least one processor; and
a non-transitory machine-readable storage medium that stores instructions executable by the at least one processor, the instructions configurable to cause the at least one processor to perform operations comprising:
controlling display of a web page comprising a plurality of GUI panels, wherein a first GUI panel of the plurality of GUI panels is focused for navigation of a first plurality of focusable user interface (UI) elements contained within the first GUI panel by actuation of a keyboard key;
receiving a panel focus switching input associated with a command to change focus away from the first GUI panel of the plurality of GUI panels, the panel focus switching input generated in response to selection of an assigned keyboard key, selection of an assigned combination of keyboard keys, or selection of an assigned sequence of keyboard keys by a user of a client device, wherein the panel focus switching input is different from the keyboard key;
in response to receiving the panel focus switching input:
identifying a second GUI panel of the plurality of GUI panels to switch focus to in accordance with a sequence defined by a focus switching order by referencing respective switching order identifiers of the plurality of GUI panels, the second GUI panel being different than the first GUI panel and the second GUI panel comprising a second plurality of focusable UI elements contained within the second GUI panel for navigation by actuation of the keyboard key; and switching focus from the first GUI panel to the second GUI panel for navigation of the second plurality of focusable UI elements within the second GUI panel by actuation of the keyboard key, responsive to identifying the second GUI panel;

saving a focus state of the first GUI panel to preserve a focused UI element of the first plurality of focusable UI elements; and after switching focus to the second GUI panel, returning focus to the first GUI panel with the focused UI element preserved.

19. The system of claim 18, the instructions configurable to cause the at least one processor to perform operations comprising:

maintaining a list of registered GUI panels currently displayed on the web page, each of the registered GUI panels having a respective focus switching order associated therewith;

wherein the identifying step uses the focus switching order of the registered GUI panels to identify the second GUI panel.

20. The system of claim 18, wherein:

the instructions are configurable to cause the at least one processor to sequentially advance focus through the second plurality of focusable UI elements in response to selection of a keyboard Tab key by the user of the client device after switching focus to the second GUI panel.

* * * * *